United States Patent
Lee et al.

(10) Patent No.: US 10,194,311 B2
(45) Date of Patent: Jan. 29, 2019

(54) METHOD FOR SETTING AND UPDATING TRACKING AREA IN C-RAN AND APPARATUS THEREFOR

(71) Applicant: LG ELECTRONICS INC., Seoul (KR)

(72) Inventors: Eunjong Lee, Seoul (KR); Jaehoon Chung, Seoul (KR); Hyeyoung Choi, Seoul (KR); Heejeong Cho, Seoul (KR); Genebeck Hahn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 216 days.

(21) Appl. No.: 15/021,641

(22) PCT Filed: Jul. 10, 2014

(86) PCT No.: PCT/KR2014/006199
§ 371 (c)(1),
(2) Date: Mar. 11, 2016

(87) PCT Pub. No.: WO2015/037820
PCT Pub. Date: Mar. 19, 2015

(65) Prior Publication Data
US 2016/0227396 A1 Aug. 4, 2016

Related U.S. Application Data

(60) Provisional application No. 61/877,300, filed on Sep. 13, 2013, provisional application No. 61/881,993, filed on Sep. 25, 2013.

(51) Int. Cl.
*H04W 8/18* (2009.01)
*H04W 60/04* (2009.01)
(Continued)

(52) U.S. Cl.
CPC ......... *H04W 8/18* (2013.01); *H04W 36/0061* (2013.01); *H04W 60/04* (2013.01); *H04W 76/30* (2018.02); *H04W 88/085* (2013.01)

(58) Field of Classification Search
CPC ... H04W 8/18; H04W 76/06; H04W 36/0061; H04W 60/04; H04W 88/085
See application file for complete search history.

(56) References Cited

U.S. PATENT DOCUMENTS

2007/0177552 A1* 8/2007 Wu ................. H04W 88/08
370/335
2010/0303041 A1 12/2010 Diachina et al.
(Continued)

FOREIGN PATENT DOCUMENTS

WO 2013125919 8/2013

OTHER PUBLICATIONS

PCT International Application No. PCT/KR2014/006199, Written Opinion of the International Searching Authority dated Oct. 29, 2014, 10 pages.
(Continued)

*Primary Examiner* — Thai Nguyen
(74) *Attorney, Agent, or Firm* — Lee, Hong, Degerman, Kang & Waimey

(57) ABSTRACT

A method for performing tracking area (TA) update by a UE in a cloud radio access network (C-RAN) includes: receiving at least one of neighbor radio remote unit (RRU) information and neighbor baseband unit (BBU) information from a primary BBU; setting a TA based on the received information and characteristics of the UE; and transmitting information on the set TA to the primary BBU during a radio resource control (RRC) connection release procedure.

10 Claims, 12 Drawing Sheets

(51) Int. Cl.
*H04W 36/00* (2009.01)
*H04W 76/30* (2018.01)
*H04W 88/08* (2009.01)

(56) References Cited

U.S. PATENT DOCUMENTS

2012/0252451 A1* 10/2012 Knauft .................... H04W 8/06
455/436
2012/0295619 A1    11/2012 Kazmi et al.
2014/0031049 A1*  1/2014 Sundaresan ........... H04W 16/02
455/447

OTHER PUBLICATIONS

Ericsson, "Evaluation of tracking area concept alternatives", R3-061786, 3GPP TSG RAN WG3 meeting #54, Nov. 2006, 6 pages.
Bart Barton, LTE and Beyond: Tracking Area Update (TAU) Procedures, Apr. 29, 2012, 9 pages.

* cited by examiner

METHOD FOR SETTING AND UPDATING TRACKING AREA IN C-RAN AND APPARATUS THEREFOR

CROSS-REFERENCE TO RELATED APPLICATIONS

This application is the National Stage filing under 35 U.S.C. 371 of International Application No. PCT/KR2014/006199, filed on Jul. 10, 2014, which claims the benefit of U.S. Provisional Application No. 61/877,300, filed on Sep. 13, 2013 and 61/881,993, filed on Sep. 25, 2013, the contents of which are all hereby incorporated by reference herein in their entirety.

TECHNICAL FIELD

The present invention relates to wireless communication and, more particularly, to a method for setting and updating a tracking area in a C-RAN (Cloud Radio Access Network) and an apparatus therefor.

BACKGROUND ART

While popularization of third generation communication systems was slow due to imbalanced development of mobile communication and mobile computing, fourth generation communication has been rapidly developed since computing environment rapidly changes from a personal computer such as desktop computer, notebook computer, etc. to personal information devices such as a smartphone, tablet, etc. Particularly, recently developed cloud computing environment requires organic combination of communication and computing of a high level, accelerating development of fourth generation communication. As LTE-Advanced and WiMAX-Advanced have been approved as fourth generation IMT-Advanced standards by ITU, discussion of fifth generation mobile communication system has begun. ITU-R WP5D in charge of IMT performed various activities for attracting interest in fifth generation communication, such as holding local workshops in the name of "IMT for the Next Decade" in 2011. In addition, WWRF conducted research on NG-Wireless system requirements and vision and published the first report. As communication service environments have remarkably changed over the past 10 years, it is very difficult to predict changes over the next 10 years. Communication standardization organizations such as ITU-R, WWRF, etc. consider the following factors of changes for 5G communication environment for 2020.

Development of multimedia services focusing on high definition video service

Provision of differentiated UX (user experience) through personalization service: provision of services suitable for preference, situation, equipment, etc. of a person.

Communication environment change from device to user: provision of user centric services is required as a user owns a plurality of communication devices. Content sharing, provision of seamless mobility between different devices, provision of security services.

Extension of M2M service: traffic increase through extension of M2M devices and provision of new M2M based services are needed.

Extension of mobile cloud computing environment: all computing environments are combined with networks to provide mobile cloud computing through provision of communication environments having low latency and high performance.

According to the above-described service environment variations, the following is under discussion for essential requirements of the 5G communication system.

Bandwidth/Throughput Improvement

According to various analysis reports, it is expected that the number of mobile devices and traffic increase on a large scale over the next 10 years. In case of mobile device, it is expected that low-end terminals will be replaced by Internet terminals such as smartphones, tablets, etc. and the number of connected terminals such as M2M devices remarkably increases although increase in the number of mobile device users is slow. According to Cisco's report, mobile traffic increased six-fold from 2008 to 2010 and is expected to increase 26-fold until 2015 to reach monthly 6.3 EB (Exabyte, 1018=260 bytes). UMTS Forum anticipates 3.8 EB in 2010 and 127 EB in 2020, which is 13 times the mobile traffic in 2010, with reference to data of IDATE. During this period, the number of mobile terminals is expected to increase from five billion to ten billion. According to this trend, it can be seen that the first goal of a fifth generation mobile communication system should be increased throughput. While there are various methods for increasing throughput, a first available method is to discover and use unused additional bandwidths. While current mobile communication systems use bandwidths of lower than 3 GHz, research on higher bandwidths is performed due to limited bandwidth. Particularly, ensuring system performance according to changed frequency characteristics in a high frequency band of 2 to 6 GHz is under study.

Provision of Uniform Service Quality

While 4G communication systems have been improved to realize 1 Gbps in terms of data throughput, service quality non-uniformity is serious such that there is a more than 30-fold difference between average spectrum efficiencies of cells and cell edges. It is very important to improve this non-uniform service quality due to the motto "provision of desired services any time anywhere" that is required for 5G communication.

Accordingly, research on performance improvement in cell edge areas is performed through technology such as WiFi offloading, addition of subsidiary cells such as Femto BS, eICIC (Enhanced Inter-cell Interference Coordination), COMP (Coordinated Multi-Point), etc. in 4G communication systems. However, it is necessary to provide uniform services of a higher level.

User Centric Organic Interoperation

While interoperation of devices is achieved on the basis of user manipulation or determined policy in the 4G system, next generation communication systems require techniques for providing services of the same level in various communication environments including organic interoperation of devices with diversification of user device. That is, it is necessary to provide techniques for achieving organic interoperation of technologies such as cellular and wireless LAN without a complicated process and providing optimized services in an optimized environment while minimizing user intervention through seamless provision of all services.

To meet the aforementioned requirements, much research is underway and, particularly, research on communication networks is carried out. However, a method for efficiently updating a tracking area by a UE in a C-RAN system has not been researched.

DISCLOSURE

Technical Problem

An object of the present invention devised to solve the problem lies in a method for updating a tracking area (TA) by a UE in a C-RAN (Cloud Radio Access Network).

Another object of the present invention is to provide a UE configured to update a TA in a C-RAN.

The technical problems solved by the present invention are not limited to the above technical problems and those skilled in the art may understand other technical problems from the following description.

Technical Solution

The object of the present invention can be achieved by providing a method for performing tracking area (TA) update by a user equipment (UE) in a cloud radio access network (C-RAN), including: receiving at least one of neighbor radio remote unit. (RRU) information and neighbor baseband unit (BBU) information from a primary BBU; setting a TA based on the received information and characteristics of the UE; and transmitting information on the set TA to the primary BBU during a radio resource control (RRC) connection release procedure. The characteristics of the UE may include at least one of the location, moving speed, mobility and capability of the UE. The TA may be set wider when the UE has high mobility than when the UE has low mobility. The TA may be set in units of BBU or RRU.

The method may further include determining update of the set TA when the UE exits the set TA. The method may further include transmitting a message for requesting information on a neighbor RRU or a neighbor BBU to the primary BBU after determination of TA update; receiving the information on the neighbor RRU or the neighbor BBU as a response to the request; and setting a new TA based on the information on the neighbor RRU or the neighbor BBU, received after determination of TA update. The method may further include transmitting a TA update request message including information on the newly set TA to the primary BBU; receiving a TA update acknowledgement message as a response to the TA update request message; and performing TA update according to the TA update acknowledgement message. The method may further include the UE selecting a specific RRU for connection establishment based upon a downlink signal received from the at least one neighbor RRU upon entering an idle mode after the RRC connection release procedure.

In another aspect of the present invention, provided herein is a user equipment (UE) of performing a tracking area (TA) update in a C-RAN, including: a receiver configured to receive at least one of neighbor RRU information and neighbor BBU information from a primary BBU; a processor configured to set a TA based on the received information and characteristics of the UE; and a transmitter configured to transmit information on the set TA to the primary BBU during an RRC connection release procedure. The processor may be configured to determine update of the set TA when the UE exits the set TA. The transmitter may be configured to transmit a message for requesting information on a neighbor RRU or a neighbor BBU to the primary BBU after determination of TA update, the receiver may be configured to receive the information on the neighbor RRU or the neighbor BBU as a response to the request and the processor may be configured to set a new TA based on the information on the neighbor RRU or the neighbor BBU, received after determination of TA update. The transmitter may be configured to transmit a TA update request message including information on the newly set TA to the primary BBU, the receiver may be configured to receive a TA update acknowledgement message as a response to the TA update request message and the processor may be configured to perform TA update according to the TA update acknowledgement message. The characteristics of the UE may include at least one of the location, moving speed, mobility and capability of the UE. The processor may be configured to set the TA wider when the UE has high mobility than when the UE has low mobility. The processor may be configured to set the TA in units of BBU or RRU.

Advantageous Effects

An idle mode UE reselects an RRU/BBU using UE centric TA information set based on UE characteristics in a C-RAN to efficiently set and update a TA.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention, illustrate embodiments of the invention and together with the description serve to explain the principle of the invention. In the drawings.

BEST MODE

Figure 1:
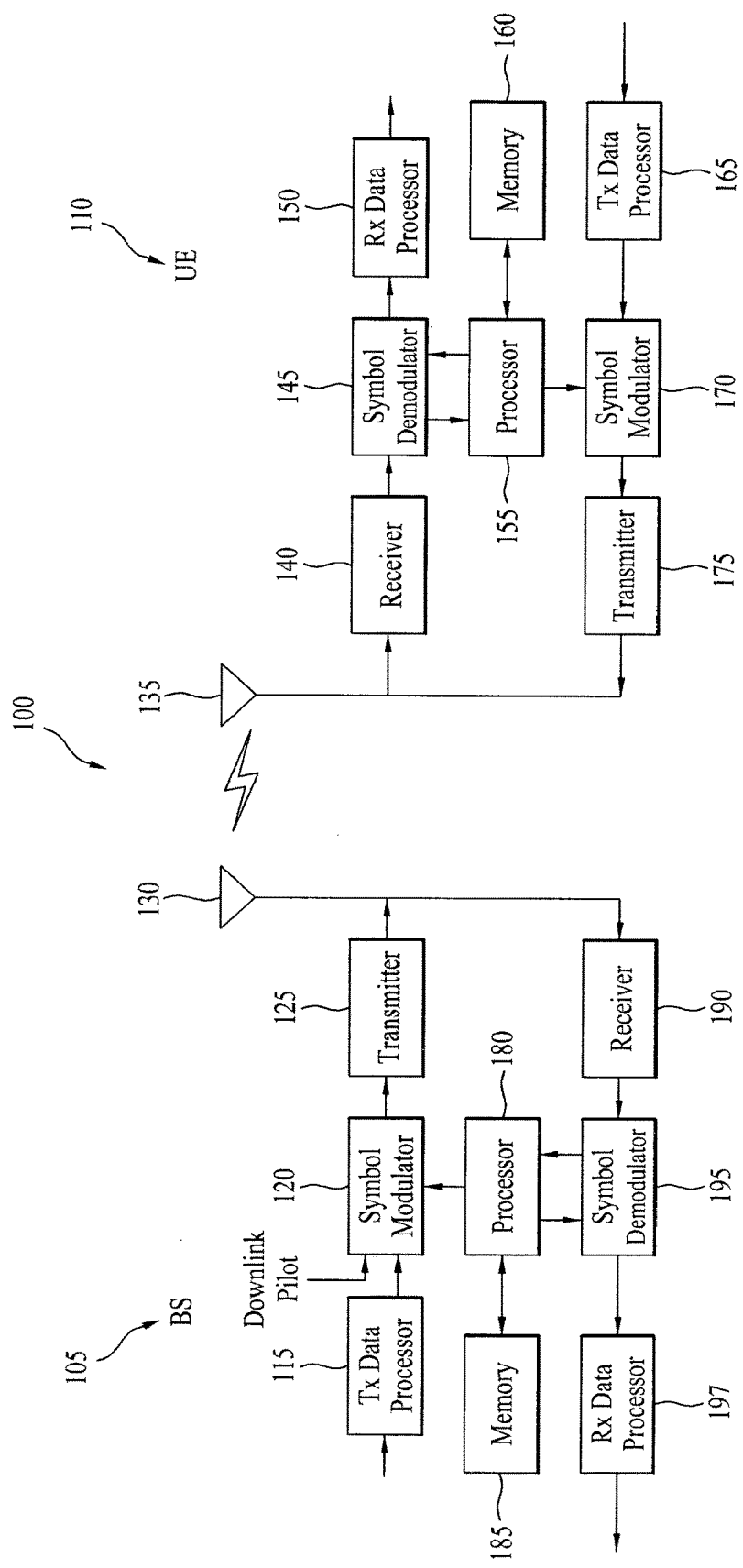
FIG. 1 is a block diagram illustrating configurations of a BS 105 and a UE 110 in a wireless communication system 100.

Reference will now be made in detail to the exemplary embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details. For example, the following detailed description is given under the assumption that 3GPP LTE and LTE-A mobile communication systems are used. However, the description is applicable to any other mobile communication system except for specific features inherent to the 3GPP LTE and LTE-A systems.

In some instances, known structures and devices are omitted, or are shown in block diagram form focusing on important features of the structures and devices, so as not to obscure the concept of the present invention. The same reference numbers will be used throughout this specification to refer to the same or like parts.

In the following description, a user equipment (UE) is assumed to refer to a mobile or fixed user end device such as a mobile station (MS), an advanced mobile station (AMS), etc. The term 'base station (BS)' is assumed to refer to any node of a network end, such as a Node B, eNode B, an access point (AP), etc., communicating with a UE. In the specification, the BS may include a cell, a sector, etc.

In a mobile communication system, a UE may receive information from a BS on a downlink and transmit information to the BS on an uplink. The information that the UE transmits or receives includes data and various types of control information. There are many physical channels according to the types and usages of information that the UE transmits or receives.

Embodiments of the present invention are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). $3^{rd}$ Generation Partnership Project (3GPP) Long Term Evolution (LTE) is a part of Evolved UMTS (E-UMTS) using E-UTRA, employing OFDMA for downlink and SC-FDMA for uplink. LTE-Advanced (LTE-A) evolves from 3GPP LTE.

It should be noted that specific terms disclosed in the present invention are proposed for convenience of description and better understanding of the present invention, and the use of these specific terms may be changed to other formats within the technical scope or spirit of the present invention.

FIG. 1 is a block diagram illustrating configurations of a BS 105 and a UE 110 in a wireless communication system 100.

While one BS 105 and one UE 110 are shown in FIG. 1 to simplify the configuration of the wireless communication system 100, the wireless communication system 100 may obviously include one or more BSs and/or one or more UEs.

Referring to FIG. 1, the BS 105 may include a transmission (Tx) data processor 115, a symbol modulator 120, a transmitter 125, a Tx/Rx antenna 130, a processor 180, a memory 185, a receiver 190, a symbol demodulator 195, and an Rx data processor 197. The UE 110 may include a Tx data processor 165, a symbol modulator 170, a transmitter 175, a Tx/Rx antenna 135, a processor 155, a memory 160, a receiver 140, a symbol demodulator 145, and an Rx data processor 150. While the antennas 130 and 135 are each shown as a single antenna in the BS 105 and the UE 110, the BS 105 and the UE 110 include multiple antennas. Hence, the BS 105 and the UE 110 support MIMO (Multiple Input Multiple Output). Furthermore, the BS 105 may support both single user-MIMO (SU-MIMO) and multi-user-MIMO (MU-MIMO) in the present invention.

On downlink, the Tx data processor 115 receives traffic data, processes the received traffic data through formatting, coding, interleaving, and modulation (or symbol mapping), and thus outputs modulated symbols ("data symbols"). The symbol modulator 120 processes the data symbols received from the Tx data processor 115 and pilot symbols, thus producing a symbol stream.

The symbol modulator 120 multiplexes the data symbols and the pilot symbols and transmits the multiplexed symbols to the transmitter 125. Each transmission symbol may be a data symbol, a pilot symbol or a zero signal value. Pilot symbols may be transmitted successively during each symbol period. The pilot symbols may be frequency division multiplexing (FDM) symbols, orthogonal frequency division multiplexing (OFDM) symbols, time division multiplexing (TDM) symbols, or code division multiplexing (CDM) symbols.

The transmitter 125 converts the symbol stream into one or more analog signals and generates a downlink signal suitable for transmission on a radio channel by additionally processing the analog signals (e.g. amplification, filtering, and frequency upconversion). The downlink signal is transmitted to the UE 110 through the antenna 130.

The UE 110 receives the downlink signal from the BS 105 through the antenna 135 and provides the received downlink signal to the receiver 140. The receiver 140 processes the downlink signal, for example, through filtering, amplification and frequency downconversion and converts the processed downlink signal into digital samples. The symbol demodulator 145 demodulates received pilot symbols and outputs the demodulated pilot symbols to the processor 155 for use in channel estimation.

The symbol demodulator 145 receives a frequency response estimate with respect to downlink from the processor 155, acquires data symbol estimates (i.e. estimates of the transmitted data symbols) by demodulating the received data symbols using the frequency response estimate and provides the data symbol estimates to the Rx data processor 150. The Rx data processor 150 demodulates the data symbol estimates (i.e. performs symbol demapping), deinterleaves the demodulated data symbols, and decodes the deinterleaved data symbols, thereby recovering the traffic data transmitted by the BS 105.

The operations of the symbol demodulator 145 and the Rx data processor 150 are complementary to the operations of the symbol modulator 120 and the Tx data processor 115 of the BS 105.

On uplink, in the UE 110, the Tx data processor 165 outputs data symbols by processing received traffic data. The symbol modulator 170 multiplexes the data symbols received from the Tx data processor 165 with pilot symbols, modulates the multiplexed symbols, and outputs a stream of the symbols to the transmitter 175. The transmitter 175 generates an uplink signal by processing the symbol stream and transmits the uplink signal to the BS 105 through the antenna 135.

The BS 105 receives the uplink signal from the UE 110 through the antenna 130. In the BS 105, the receiver 190 acquires digital samples by processing the uplink signal. The symbol demodulator 195 provides uplink pilot symbol estimates and uplink data symbol estimates by processing the digital samples. The Rx data processor 197 processes the data symbol estimates, thereby recovering the traffic data transmitted by the UE 110.

The processors 155 and 180 control, adjust and manage operations of the UE 110 and the BS 105. The processors 155 and 180 may be connected respectively to the memories 160 and 185 that store program code and data. The memories 160 and 185 store an operating system, applications, and general files, in connection with the processors 155 and 180.

The processors 155 and 180 may also be called controllers, microcontrollers, microprocessors, or microcomputers. The processors 155 and 180 may be configured in hardware, firmware, software, or a combination thereof. When embodiments of the present invention are implemented using hardware, application specific integrated circuits (ASICs), digital signal processors (DSPs), digital signal processing devices (DSPDs), programmable logic devices (PLDs), or field programmable gate arrays (FPGAs) which are adapted to implement the present invention may be included in the processors 155 and 180.

When the embodiments of the present invention are implemented using firmware or software, the firmware or software may be configured to include a module, a procedure, a function, etc. which performs functions or operations according to the present invention. The firmware or software may be included in the processors 155 and 180, or stored in the memories 160 and 185 and invoked from the memories 160 and 185 by the processors 155 and 180.

The layers of radio interface protocols between a UE/BS and a network may be classified into Layers 1, 2 and 3 (L1, L2 and L3) based on the three lowest layers of the open system interconnection (OSI) model. A physical layer corresponds to L1 and provides an information transmission service on physical channels. A radio resource control (RRC) layer corresponds to L3 and provides radio control resources between the UE and the network. The UE/BS and the network exchange RRC messages through the RRC layer.

In the specification, a processor 155 of a UE 110 and a processor 180 of an eNB 105 have a function of processing signals and data except for functions of receiving or transmitting signals and storing signals. However, the processors 155 and 180 will not be particularly mentioned below for convenience of description. Even though the processors 155 and 180 are not mentioned, the processors 155 and 180 can be considered to perform operations of processing data, instead of operations of receiving or transmitting signals and storing signals.

Fifth generation (5G) communication network technology is divided into a wireless access network and a core network. There are two flows in the wireless access network field. One flow is a centralized access network through introduction of network cloud. Three core technologies that enable network cloud are RRH (Remote Radio Head)/CoMP (Coordinated Multi-Point), software modem and cloud computing.

In the wireless access network, introduction of RRH enables network cloud. RRH induces remarkable change in a wireless access network structure while the RRH is a very important element in terms of radio transmission.

Figure 2:
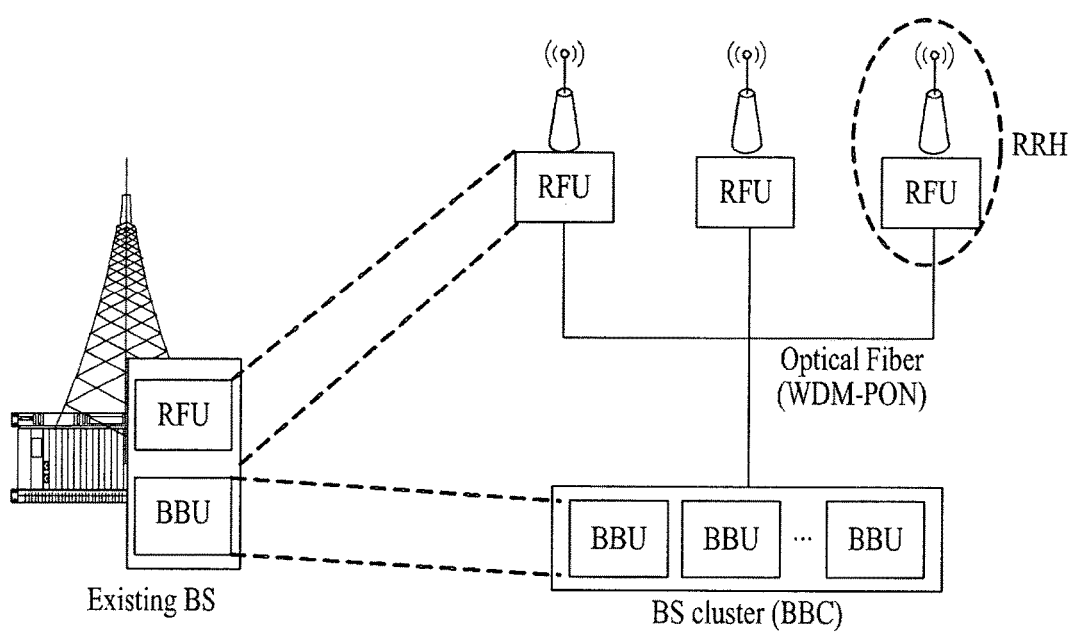
FIG. 2 illustrates the concept of RRH and a change in BS/RAN architecture through RRH.

FIG. 2 illustrates the concept of an RRH and change of an eNB/RAN structure through the RRH.

Though the RRH was developed as an optical relay, it is used as a core element for implementing a centralized eNB. Introduction of the RRH enables network cloud in the wireless access network field. The RRH induces innovative change in a wireless access network structure while it is a very important element in radio transmission. With the introduction of the RRH, physical eNBs need not be dispersed since a radio frequency unit (RFU) and a baseband unit (BBU) are physically divided. In the case of a recently introduced cloud access network, one apparatus can operate a network through interoperation with hundreds of RRHs. Consequently, a cell different from a conventional cell is created.

While all wireless access operations have been defined based on cells, it is necessary to newly establish the concept of a cell through the aforementioned structural change. In 3GPP, various scenarios in a situation where an RRH and a macro eNB are present are under discussion through Release 11 CoMP (Coordinated Multi-Point) Work Item. Recently, the concept of sharing a single RRH by multiple cells, such as SAS (Shared Antenna System), has been researched. In addition, the concept of dynamically changing a cell area by controlling RRH clustering is studied. In this situation, there is a rising interest in the recently proposed C-RAN.

Figure 3:
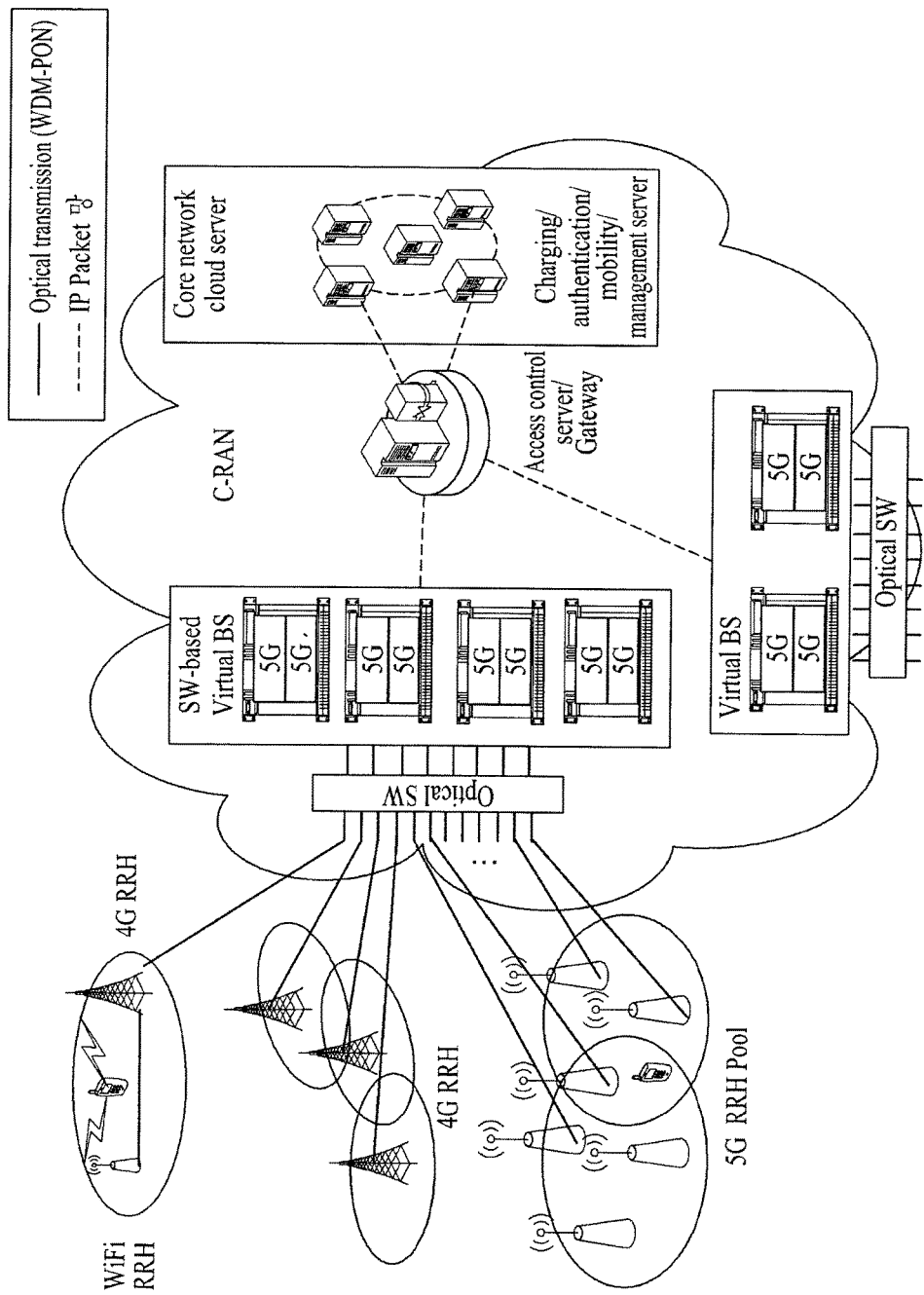
FIG. 3 illustrates the concept of a cloud network based on C-RAN.

FIG. 3 illustrates the concept of a cloud network based on C-RAN.

FIG. 3 shows the concept of C-RAN. The C-RAN may include a plurality of RRHs, a software based virtual base station (VBS), an access control server for controlling the VBS and a core network cloud server (resource management server, charging/authentication server, etc.). As described above, elements of the C-RAN operate in organic relation with elements of a core network as the elements of the core network change to open IP network elements.

As shown in FIG. 3, the RRHs are connected to the VBS through an optical connecting apparatus. The VBS is implemented based on software. The VBS may be implemented through various wireless access technologies such as LTE (Long Term Evolution), HSPA, WiMAX/WiFi, etc. One or more RRHs are grouped and controlled through a single VBS. While a cell area is fixed in conventional networks, RRH cluster can be dynamically changed to dynamically allocate cells in the C-RAN. Dynamic allocation may be controlled according to user distribution in an area. Accordingly, it is necessary to consider a method for configuring a user centric cell per user.

As shown in FIG. 3, the RRHs are connected to the VBS through an optical connecting apparatus. The VBS is implemented based on software. The VBS may be implemented through various wireless access technologies such as LTE, HSPA, WiMAX/WiFi, etc. One or more RRHs are grouped and controlled through a single VBS. While a cell area is fixed in conventional networks, RRH cluster can be dynamically changed to dynamically allocate cells in the C-RAN.

Figure 4:
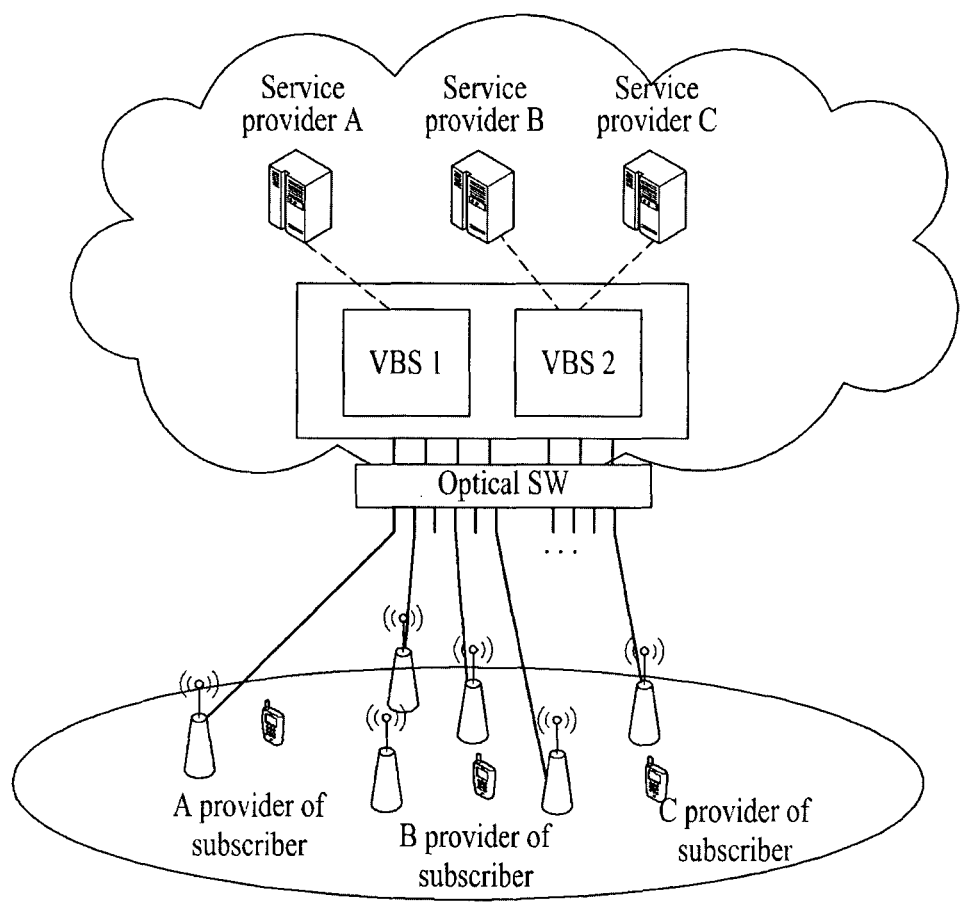
FIG. 4 illustrates the concept of a user centric cell.

FIG. 4 illustrates a scenario of sharing RRH and VBS in the C-RAN.

A virtual structure such as C-RAN presents new possibilities in terms of network openness and network sharing. Each country implements various policies for introduction of elements of competition of communication market. Examples of the policies are introduction of virtual operator (MVNO) and base station/AP (Access Point) sharing. When a VBS is introduced, various scenarios can be provided. For example, a virtual operator can configure a VBS thereof in an environment in which interface with RRH is maintained and multiple virtual operators can share the same radio resource.

In FIG. 4, service providers A, B and C provide services by sharing the same RRH pool. Particularly, service providers B and C provide services thereof using the same VBS. A VBS provider can charge providers B and C for access on the basis of the quantity of used radio resources, and each provider can support subscribers by applying a resource allocation policy thereof to predetermined radio resources.

Recently, services of trading frequency resources in real time have been activated around the U.S. In a VBS environment, a new frequency related business in the form of leasing frequency resources may be created.

The second flow is reinforcement of distribution layer. While centralization and central processing function of wireless access networks have been reinforced through the C-RAN, capacity of a VBS or an access server of the C-RAN is limited. In case of a BS connected through a private IP network, such as a femto BS, particularly, it is difficult to manage BSs connected through a private IP network, such as femto BSs in an integrated manner in real time. In addition, in recent D2D (Device-to-Device) communication, there is a limit in controlling all operations by a network. Consequently, a C-RAN based public access network will have a centralized control structure and local communication such as femto BS and D2D communication will have a distributed control structure.

Figure 5:
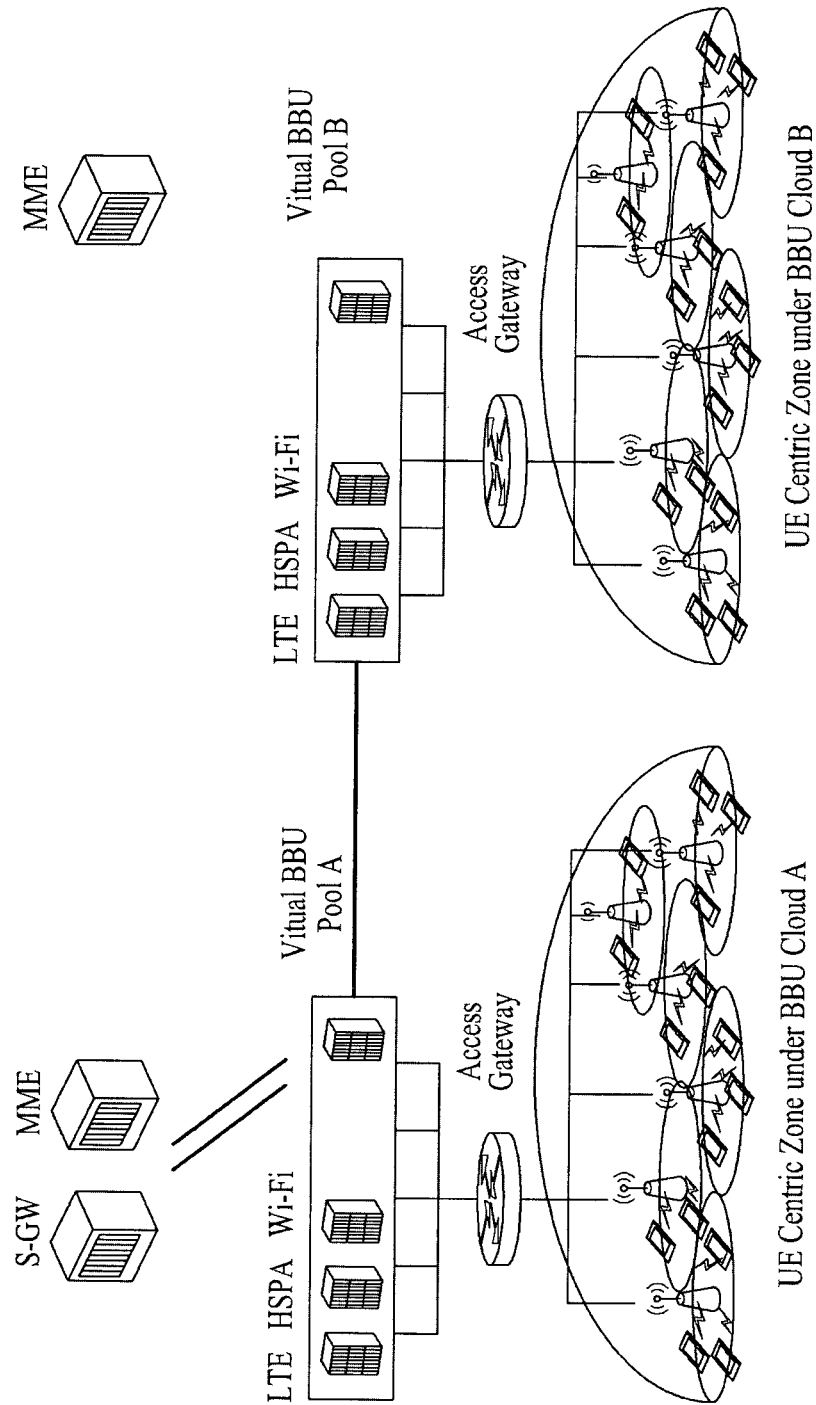
FIG. 5 illustrates a scenario of sharing RRHs and virtual BSs in a C-RAN

FIG. 5 illustrates a C-RAN architecture.

Recently, a radio access network structure has been changed to a structure in which various types of small cells (pico, femto, etc.) and a macro cell interoperate. This is for the purpose of improving QoE (Quality of Experience) by providing a high data throughput to a final user in a situation in which multi-layer cells in a hierarchical structure in which the macro cell is involved are present. In Small Cell Enhancements for E-UTRA and E-UTRAN SI, one of 3GPP standardization categories, improvement of indoor/outdoor scenarios using low power nodes is under discussion and scenarios and requirements therefor are described in TR 36.932. In addition, derivation of benefits with respect to dual connectivity concept in which a user has simultaneous connectivity to a macro cell layer and small cell layers using the same or different carriers is under discussion. Considering this trend, final users will be located physically closer to a network according to deployment of an extremely large number of small cells. Accordingly, it is expected that communication through a user centric virtual zone rather than physical cell based communication will be performed in a 5G radio access network. To enable communication through the user centric virtual zone, it is necessary to derive and solve technical issues for implementing a service provision unit such as the user centric zone, discriminated from the conventional cell based service provision unit, which may largely affect the current RAN.

A description will be given of a location registration method in an idle mode in a 3GPP LTE system.

Tracking Area for Idle Mode UE

A BS transmits cellAccessRelatedInfo through SystemInformationBlockType1 message. Here, cellAccessRelatedInfo parameter includes the following information.

```
SystemInformationBlockType1 ::= SEQUENCE {
    cellAccessRelatedInfo     SEQUENCE {
        plmn-IdentityList         PLMN-IdentityList,
        trackingAreaCode          TrackingAreaCode,
        cellIdentity              CellIdentity,
        cellBarred                ENUMERATED {barred,
                                              notBarred},
        intraFreqReselection      ENUMERATED {allowed,
                                              notAllowed},
        csg-Indication            BOOLEAN,
        csg-Identity              CSG-Identity        OPTIONAL --
                                  Need
```

-continued

```
                                  OR
                              },
```

A trackingAreaCode that is common for all the PLMNs listed. TrackingAreaCode is used to identify a tracking area within the scope of a PLMN, see TS 24.301

Network Entity Related Identities

Tracking Area identity (TAI): used to identify tracking areas. The TAI is constructed from the PLMN identity the tracking area belongs to and the TAC (Tracking Area Code) of the Tracking Area.

NAS Protocol States & State Transitions

The NAS state model is based on a two-dimensional model which consists of EPS Mobility Management (EMM) states describing the mobility management states that result from the mobility management procedures e.g. Attach and Tracking Area Update procedures, and of EPS Connection Management (ECM) states describing the signaling connectivity between the UE and the EPC. The ECM and EMM states are independent of each other and when the UE is in EMM-CONNECTED state this does not imply that the user plane (radio and S1 bearers) is established.

The relation between NAS and AS states is characterized by the following principles:
EMM-DEREGISTERED & ECM-IDLE RRC_IDLE:
Mobility: PLMN selection:
UE Position: not known by the network.
EMM-REGISTERED & ECM-IDLE RRC_IDLE:
Mobility: cell reselection;
UE Position: known by the network at tracking area level.
EMM-REGISTERED & ECM-CONNECTED with radio
    bearers established RRC_CONNECTED.
Mobility: handover;
UE Position: known by the network at cell level.
General Description of Idle Mode The idle mode tasks can be subdivided into four processes:
PLMN selection;
When a UE is switched on, a public land mobile network (PLMN) is selected by NAS. For the selected PLMN, associated RAT(s) may be set [5]. The NAS provides a list of equivalent PLMNs, if available, that the AS uses for cell selection and cell reselection Cell selection and reselection;
With the cell selection, the UE searches for a suitable cell of the selected PLMN and chooses that cell to provide available services, further the UE tuned to its control channel. This choosing is known as "camping on the cell".

Location registration;
The UE shall, if necessary, then register its presence, by means of a NAS registration procedure, in the tracking area of the chosen cell and as outcome of a successful Location Registration the selected PLMN becomes the registered PLMN.

If the UE finds a more suitable cell, according to the cell reselection criteria, it reselects onto that cell and camps on it. If the new cell does not belong to at least one tracking area to which the UE is registered, location registration is performed.

Support for manual CSG selection.
Search of available CSGs may be triggered by NAS to support manual CSG selection.
If the UE loses coverage of the registered PLMN, either a new PLMN is selected automatically (automatic mode), or an indication of which PLMNs are available is given to the user, so that a manual selection can be made (manual mode).

The purpose of camping on a cell in idle mode is fivefold:

a) It enables the UE to receive system information from the PLMN.

b) When registered and if the UE wishes to establish an RRC connection, it can do this by initially accessing the network on the control channel of the cell on which it is camped.

c) If the PLMN receives a call for the registered UE, it knows (in most cases) the set of tracking areas in which the UE is camped. It can then send a "paging" message for the UE on the control channels of all the cells in this set of tracking areas. The UE will then receive the paging message because it is tuned to the control channel of a cell in one of the registered tracking areas and the UE can respond on that control channel.

d) It enables the UE to receive ETWS and CMAS notifications.

e) It enables the UE to receive MBMS services.

If the UE is unable to find a suitable cell to camp on or if the location registration failed (except for LR rejected with cause #12, cause #14, cause #15 or cause #25, see [5] and [16]), it attempts to camp on a cell irrespective of the PLMN identity, and enters a "limited service" state.

| Functional division between AS and NAS in Idle mode | | |
|---|---|---|
| Idle Mode Process | UE Non-Access Stratum | UE Access Stratum |
| Location registration | Register the UE as active after power on. Register the UE's presence in a registration area, for instance regularly or when entering a new tracking area. Maintain lists of forbidden registration areas. Deregister UE when shutting down. | Report registration area information to NAS. |

Tracking Area Registration

In the UE, the AS reports tracking area information to the NAS.

If the UE reads more than one PLMN identity in the current cell, the UE shall report the found PLMN identities that make the cell suitable in the tracking area information to NAS.

The NAS part of the location registration process is specified in TS 23.122.

[TS 23.122] 4.5.2 Initiation of Location Registration

An LR request indicating Normal Updating is made when, in idle mode,
 the Periodic Tracking Area Update timer expires while the EPS update status is "NOT UPDATED" (triggers Tracking Area Update);

An MS which is attached for PS services and enters a new PLMN performs a routing area update or a tracking area update if the following conditions are fulfilled:
 if the MS is in S1 mode, the currently stored TAI list does not contain the TAI of the current serving cell;
 the LAI, TAI or PLMN identity of the current serving cell is not contained in any of the lists "forbidden LAs for roaming", "forbidden TAs for roaming", "forbidden LAs for regional provision of service", "forbidden TAs for regional provision of service", "forbidden PLMNs for GPRS service" or "forbidden PLMNs", or the MS has a PDN connection for emergency bearer services;
 the current update state is different from "Idle, No IMSI"; and
 the MS is configured to perform the attach procedure with IMSI at PLMN change (see "AttachWithIMSI" leaf of the NAS configuration MO in 3GPP TS 24.368 [50] or USIM file NASCONFIG in 3GPP TS 31.102 [40]) and the new PLMN is the registered PLMN or an equivalent PLMN; or
 the MS is not configured to perform the attach procedure with IMSI at PLMN change.

Actions for the UE AS upon reception of Location Registration reject are specified in TS 36.211 and TS 36.331.

Actions upon reception of the SystemInformationBlock-Type1 message

Upon receiving the SystemInformationBlockType1 either via broadcast or dedicated signaling, the UE shall:

1> if in RRC_CONNECTED and the UE supports multi-band cells as defined by bit 31 in featureGroupindicators:

2> disregard the freqBandIndicator and multiBandInfo-List, if received, while in RRC_CONNECTED;

2> forward the cellIdentity to upper layers;

2> forward the trackingAreaCode to upper layers;

1> else

2> if the frequency band indicated in the freqBandIndi-cator is part of the frequency bands supported by the UE; or 2> if the UE supports multiBandInfoList, and if one or more of the frequency bands indicated in the multiBandIn-foList are part of the frequency bands supported by the UE:

3> forward the cellIdentity to upper layers;

3> forward the trackingAreaCode to upper layers;

2> else:

3> consider the cell as barred in accordance with TS 36.304 [4] and;

3> perform barring as if intraFreqReselection is set to notAllowed, and as if the csg-Indication is set to FALSE;

AreaConfiguration

The AreaConfiguration indicates area for which UE is requested to perform measurement logging. If not configured, measurement logging is not restricted to specific cells or tracking areas but applies as long as the RPLMN is contained in plmn-IdentityList stored in VarLogMeasReport.

| AreaConfiguration information element |
|---|
| -- ASN1START |
| |
| AreaConfiguration-r10 ::= CHOICE { |
|     cellGlobalIdList-r10    CellGlobalIdList-r10, |
|     trackingAreaCodeList-r10    TrackingAreaCodeList-r10 |
| } |
| |
| AreaConfiguration-v11x0 ::=    SEQUENCE { |

| AreaConfiguration information element | |
|---|---|
| trackingAreaCodeList-r11 | TrackingAreaCodeList-r11 |
| } | |
| CellGlobalIdList-r10 ::= | SEQUENCE (SIZE (1..32)) OF CellGlobalIdEUTRA |
| TrackingAreaCodeList-r10 ::= | SEQUENCE (SIZE (1..8)) OF TrackingAreaCode |
| TrackingAreaCodeList-r11 ::=<br>    plmn-Identity-perTAC-List-r11 | SEQUENCE {<br>    SEQUENCE (SIZE (1..8)) OF PLMN-Identity |
| } | |
| -- ASN1STOP | |
| ■ AreaConfiguration field descriptions | |

■ plmn-Identity-perTAC-List
Includes the PLMN identity for each of the TA codes included in trackingAreaCodeList. The PLMN identity listed first in plmn-Identity-perTAC-List corresponds with the TA code listed first in trackingAreaCodeList and so on.

RRC Connection Release

Figure 6:
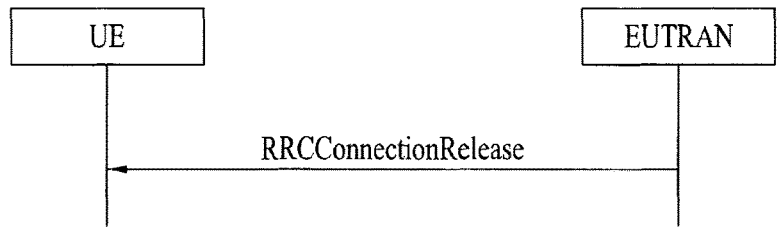
FIG. 6 illustrates an exemplary RRC connection release procedure.

FIG. 6 illustrates an exemplary RRC connection release procedure.

The purpose of this procedure is to release the RRC connection, which includes the release of the established radio bearers as well as all radio resources.

Initiation

E-UTRAN initiates the RRC connection release procedure to a UE in RRC_CONNECTED.

Reception of the RRCConnectionRelease by the UE

The UE shall:

1> delay the following actions defined in this sub-clause 60 ms from the moment the RRCConnectionRelease message was received or optionally when lower layers indicate that the receipt of the RRCConnectionRelease message has been successfully acknowledged, whichever is earlier;

1> if the RRCConnectionRelease message includes the idleModeMobilityControlInfo:

2> store the cell reselection priority information provided by the idleModeMobilityControlInfo;

2> if the t320 is included:

3> start timer T320, with the timer value set according to the value of t320;

1> else:

2> apply the cell reselection priority information broadcast in the system information;

1> if the releaseCause received in the RRCConnectionRelease message indicates loadBalancingTAURequired:

2> perform the actions upon leaving RRC_CONNECTED as specified in 5.3.12, with release cause 'load balancing TAU required';

1> else if the releaseCause received in the RRCConnectionRelease message indicates cs-FallbackHighPriority:

2> perform the actions upon leaving RRC_CONNECTED as specified in 5.3.12, with release cause 'CS Fallback High Priority';

1> else:

2> if the extendedWaitTime is present and the UE supports delay tolerant access:

3> forward the extendedWaitTime to upper layers;

2> perform the actions upon leaving RRC_CONNECTED as specified in 5.3.12, with release cause other';

T320 expiry

The UE shall:

1> if T320 expires:

2> if stored, discard the cell reselection priority information provided by the idleModeMobilityControlInfo or inherited from another RAT;

2> apply the cell reselection priority information broadcast in the system information;

RRC connection release requested by upper layers

General

The purpose of this procedure is to release the RRC connection. Access to the current PCell may be barred as a result of this procedure.

Upper layers invoke the procedure, e.g. upon determining that the network has failed an authentication check, see TS 24.301 [35].

Initiation

The UE initiates the procedure when upper layers request the release of the RRC connection. The UE shall not initiate the procedure for power saving purposes.

The UE shall:

1> if the upper layers indicate barring of the PCell:

2> treat the PCell used prior to entering RRC_IDLE as barred according to TS 36.304 [4];

1> perform the actions upon leaving RRC_CONNECTED as specified in 5.3.12, with release cause 'other';

S1 UE Context Release Procedure

Figure 7:
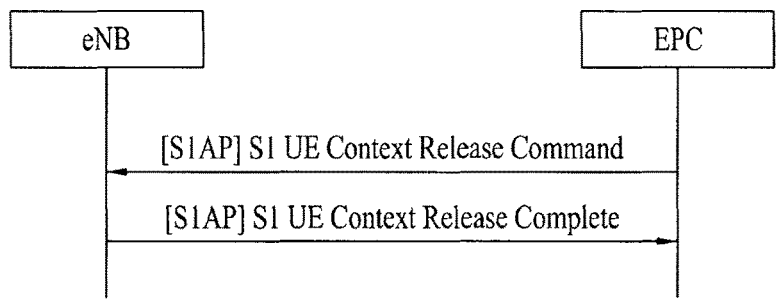
FIG. 7 illustrates an exemplary S1 UE context release procedure.

FIG. 7 illustrates an exemplary S1 UE context release procedure.

The S1 UE Context Release procedure causes the eNB to remove all UE individual signalling resources and the related user data transport resources. This procedure is initiated by the EPC and may be triggered on request of the serving eNB.

The EPC initiates the UE Context Release procedure by sending the S1 UE Context Release Command towards the E-UTRAN. The eNodeB releases all related signalling and user data transport resources.

The eNB confirms the S1 UE Context Release activity with the S1 UE Context Release Complete message.

In the course of this procedure the EPC releases all related resources as well, except context resources in the EPC for mobility management and the default EPS Bearer/E-RAB Configuration.

S1 UE Context Release Request (eNB Triggered)

Figure 8:
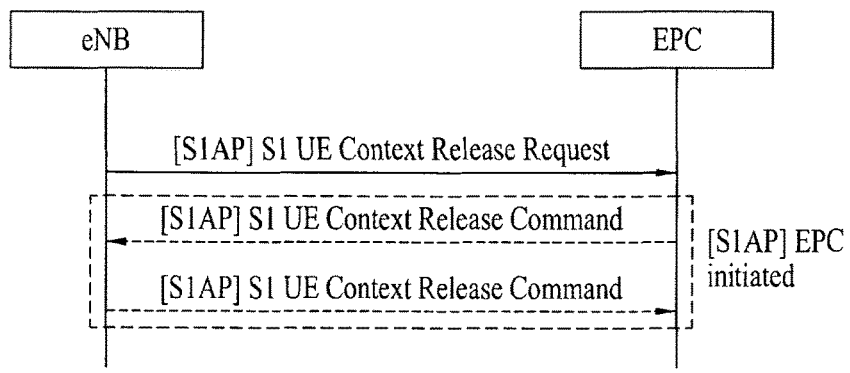
FIG. 8 illustrates an exemplary S1 UE context release request procedure (eNB triggered)

The S1 UE Context Release Request procedure is initiated for E-UTRAN internal reasons and comprises the following steps:
  The eNB sends the S1 UE Context Release Request message to the EPC.
  The EPC triggers the EPC initiated UE context release procedure.
FIG. 8 illustrates an exemplary SI UE context release request procedure (eNB triggered).
The S1 UE Context Release Request procedure is initiated for E-UTRAN internal reasons and comprises the following steps:
  The eNB sends the S1 UE Context Release Request message to the EPC.
  The EPC triggers the EPC initiated UE context release procedure.
If the E-UTRAN internal reason is a radio link failure detected in the eNB, the eNB waits a sufficient time before triggering the S1 UE Context Release Request procedure in order to allow the UE to perform the NAS recovery procedure, see TS 23.401 [17].

E-RAB Release Procedure

E-RAB: An E-RAB uniquely identifies the concatenation of an S1 Bearer and the corresponding Data Radio Bearer. When an E-RAB exists, there is a one-to-one mapping between this E-RAB and an EPS bearer of the Non Access Stratum.

Figure 9:
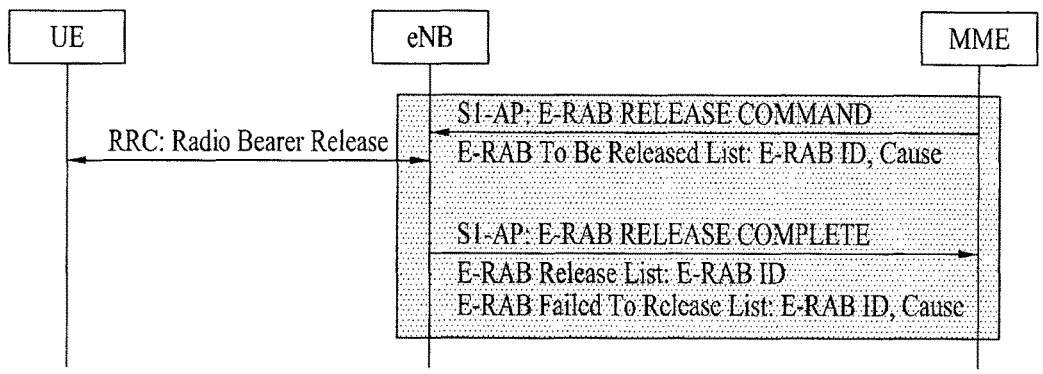
FIG. 9 illustrates an exemplary E-RAB release procedure.

FIG. 9 illustrates an exemplary E-RAB release procedure.

The E-RAB Release procedure is initiated by the MME to release resources for the indicated E-RABs.

The E-RAB Release procedure comprises the following steps:
  The E-RAB RELEASE COMMAND message is sent by the MME to the eNB to release resources on S1 and Uu for one or several E-RAB(s). With the E-RAB ID(s) in the E-RAB To Be Released List contained in E-RAB RELEASE COMMAND message the MME identifies, the E-RAB(s) to be released.
  Upon receipt of the E-RAB RELEASE COMMAND message the eNB releases the Data Radio Bearers (RRC: Radio bearer release) and S1 Bearers.
  The eNB responds with an E-RAB RELEASE COMPLETE message containing E-RAB Release list and E-RAB Failed to Release list. With the E-RAB IDs in the E-RAB Release List/E-RAB Failed to Release List the eNB identifies the E-RAB(s) successfully released or failed to release.
  Interactions with UE Context Release Request Procedure:
  In case of no response or negative response from the UE or in case the eNB cannot successfully perform the release of any of the requested bearers, the eNB triggers the S1 UE Context Release Request procedure, except if the eNB has already initiated the procedures associated with X2 Handover.

E-RAB Release Indication Procedure

Figure 10:
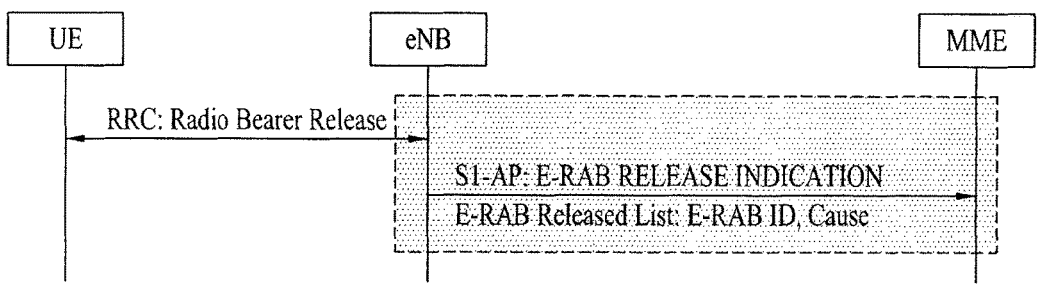
FIG. 10 illustrates an exemplary E-RAB release indication procedure.

FIG. 10 illustrates an exemplary E-RAB release indication procedure.

The E-RAB Release Indication procedure enables the E-UTRAN to send information about released resources for one or several E-RABs to the MME. The eNB initiates the procedure by sending the E-RAB RELEASE INDICATION message to the MME. The E-RAB ID(s) in the E-RAB Released List identifies the released E-RAB(s) in the eNB.

According to 3GPP TS 36.300, a cell is described by a combination of downlink (DL) resources and optional uplink (UL) resources, and information about link between a carrier frequency for DL resources and a carrier frequency for UL resources can be included in system information transmitted through the DL resources and delivered. Considering 5G high-density small cell deployment, setting of user centric connectivity, one of characteristics which can be provided in the corresponding scenario, is expected to be an important issue. This assumes a situation in which BBUs are separated from RRUs as in C-RAN and means an environment in which a plurality of BBUs is located in a physical place and provides services to users while changing mapping to RRUs time-variantly. RRUs may be simultaneously mapped to only a single BBU or a plurality of BBUs. To achieve this, physical cell based user association will disappear and user centric virtual zone based association will become an important issue.

A user centric virtual zone based user location management procedure needs to be considered for an idle mode UE as well as a connected mode UE. The location of the idle mode UE has been recognized based on a multi-cell based tracking area (TA) and continuously detected through tracking area update. However, as a new C-RAN scenario based on BBI and RRU is applied, it is necessary to newly define a method for detecting the location of the idle mode UE, suitable for the scenario. Accordingly, it is expected that user centric virtual zone based management of location information on the idle mode UE will become an important issue.

The present invention implements setting of user centric connectivity instead of conventional cell based user connectivity. That is, a zone in which a network can provide an optimized communication environment per user is configured to provide services based on the zone, distinguished from conventional architecture in which users access a physical cell to be provided with services. To achieve this, the following is assumed.

1. All RRUs in the same virtual BBU pool have the same virtual cell ID and the virtual BBU pool (all BBUs within the virtual BBU pool) and all RRUs are connected via ideal backhaul such that an RRU is under control of a BBU mapped thereto.

2. A synchronization signal used for UL synchronization acquisition is transmitted by each RRU and RRU ID capable of identifying each RRU as well as virtual cell ID capable of representing the virtual BBU pool to which RRUs belong can be included in the synchronization signal and transmitted.

3. Each RRU provides only L1 processing and processing of higher layers of L2/L3 is performed by BBUs present in the virtual BBU pool. In addition, RRUs have SAS (Shared Antenna System) property, which means that an RRU can time-variantly change the BBU to which the RRU belongs to another BBU in the virtual BBU pool.

Based on the above assumption, the present invention provides the following procedure for user centric TA management of an idle mode UE. A description will be given of a detailed procedure for user centric TA management.
  1. RRC connection release
  2. BBU/RRU (re)selection
  3. User centric Location Registration
  1. RRC Connection Release
A UE transmitting/receiving data through one or more RRUs may release (for example, RRC release in case of LTE and disassociation in case of WiFi) connection with a primary BBU (or serving BBU) in order to release a radio bearer and radio resource. It is assumed that the primary BBU in a C-RAN is used for a radio access technology (RAT) (e.g. cellular) that continuously ensures connectivity like LTE, and the present invention is described based on LTE/LTE-A. However, a BBU of a different RAT may be used for primary connection.

The present invention proposes a scheme in which a UE sets a TA thereof to user centric coverage suitable for characteristics of the UE when the UE performs a connection release procedure. That is, the UE sets the TA according to the speed and location thereof or user characteristics. Here, the TA may be based on RRU or BBU and may refer to a paging message transmission unit when data/call transmitted from a network to a UE is received. A UE centric TA can be transmitted from a UE to an MME or from the MME to the UE in an RRC connection release process and an eNB (i.e. BBU or BBU pool that stores contexts of the corresponding UE) that has performed RRC connection release releases all contexts of the UE RRC connection release of LTE can be triggered by a UE (e.g. by a timer) or a network (e.g. from EPC) and a method therefor can conform to the following release procedure (RRC connection release example).

1) When triggered by a network
a) An EPC (Evolved Packet Core) (e.g. MME) transmits S1 UE context release command message to an eNB (BBU or BBU pool) and b) RRC connection release is performed between the eNB (BBU or BBU pool) and the UE. c) The eNB (BBU or BBU pool) transmits S1 UE context release complete message to the EPC upon successful RRC connection release.

2) When triggered by the UE
a) RRC connection release is performed between the eNB (BBU or BBU pool) and the UE. b) The eNB (BBU or BBU pool) transmits S1 UE context release request message to the ECP upon successful RRC connection release.

2. BBU/RRU (Re)Selection (Camping on the RRU and/or BBU)

After the UE performs RRC connection release, the network can check the location of the UE entering the idle mode based on the aforementioned UE centric TA. The UE in the idle mode needs to search for a suitable RRU/BBU capable of providing available services and to select a specific RRU in order to monitor control channels. Upon detection of RRUs having downlink signals that satisfy a predetermined specific value (e.g. specific signal intensity threshold) or higher, the idle mode UE having mobility selects an RRI (and/or BBU) having a downlink signal having highest intensity for the UE from the RRUs. If the UE switches from the connected mode to the idle mode, then the UE preferably selects the last connected RRU (and/or BBU) and may reselect a new RRU upon detection of an RRC having a downlink signal stronger than that of the selected RRU. In addition, upon determining that a BBU mapped to the selected RRU is not suitable for the UE through BBU related broadcast information received through the selected RRU, the UE may reselect an RRU belonging to a different BBU. The present invention defines this selection procedure as BBU/RRU (re)selection. When the UE selects a specific RRU (and/or BBU), the UE can be defined as camping on the RRU and/or BBU.

Furthermore, the UE needs to monitor a paging message that can be transmitted thereto from the camped on RRU/BBU and may perform connection establishment through the RRI as necessary.

3. User Centric Location Registration

The present invention proposes a scheme in which the UE sets the TA thereof based on characteristics thereof, distinguished from the conventional method of explicitly mapping a geographical TA. That is, TA coverage is set depending on UE characteristics.

1) In the case of a UE initially entering idle mode

An MME/UE sets a TA of the UE in consideration of stored UE characteristics (e.g. movement speed, mobility, location and capability) when the UE enters the idle mode. For example, a wide TA can be set when the UE rapidly moves and a narrow TA can be set when the UE slowly moves. In addition, a narrow TA can be set when the UE has low mobility and a wide TA can be set when the UE has high mobility. A user centric TA may be a new unit defined by a BBU and/or an RRU or an operator and a coverage list based on the BBU and/or RRU belonging to the user centric TA or a specific unit can be transmitted to the UE.

(1) Case in which a network sets a user centric TA of a UE

Figure 11:
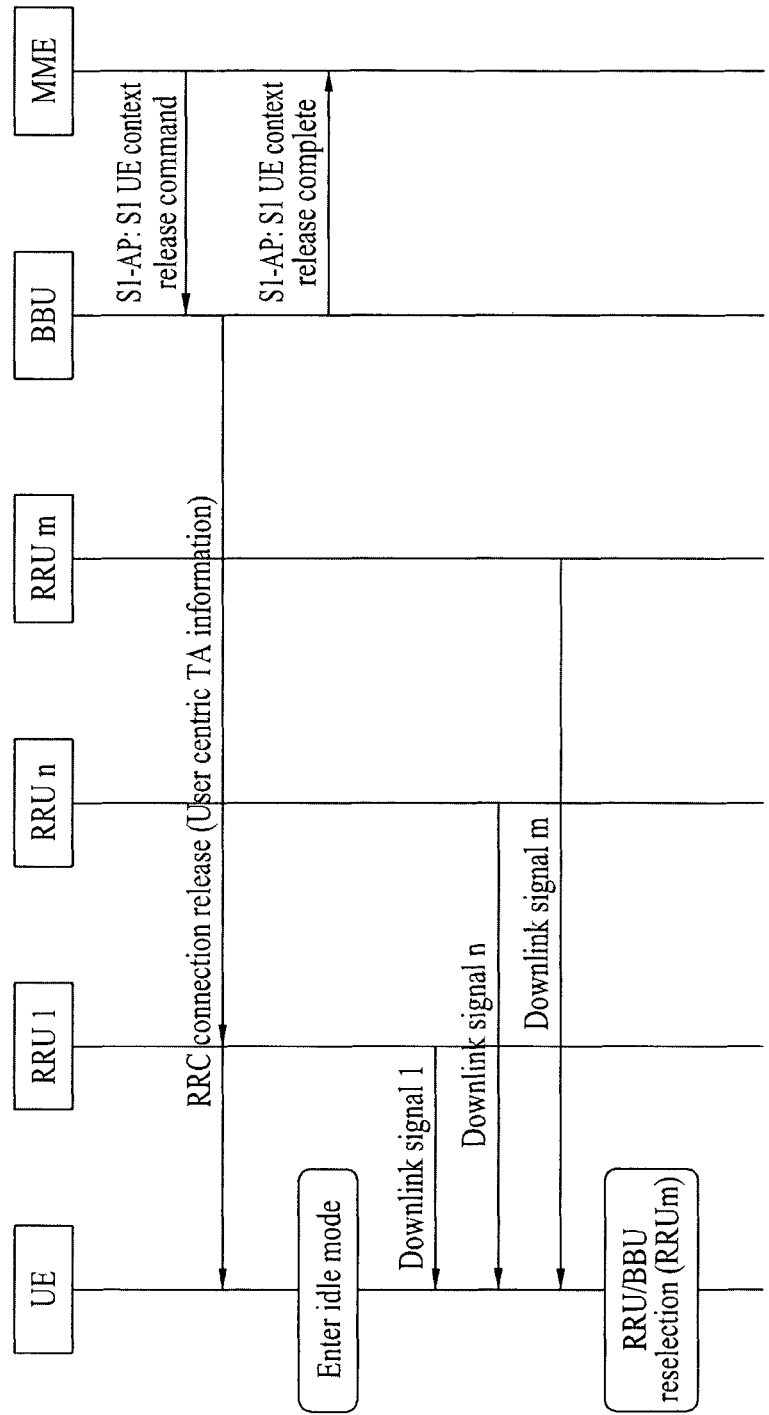
FIG. 11 illustrates a procedure in which a network sets a user centric TA of a UE.

FIG. 11 illustrates a procedure in which a network sets a user centric TA of a UE.

Referring to FIG. 11, an MME transmits information on a list of RRUs and/or BBUs belonging to the TA to a BBU (eNB) through S1 UE context release command message when the UE enters the idle mode. Then, the BBU (eNB) may transmit the information on the list of RRUs and/or BBUs belonging to the TA to the UE through an RRC connection release message. In addition, the BBU (eNB) may notify the MME that RRC connection release of the UE is complete by transmitting an S1 UE context release complete message to the MME. The user centric TA can be set per RRU or BBU and the transmitted information can be defined as one of the following information types.

a. RRU ID list
b. BBU ID list
c. RRU and BBU mapping ID list
d. BBU pool ID

Here, the aforementioned information may include RRU ID and BBU ID with respect to a plurality of RATs. The UE in the idle mode may reselect a BBU/RRU based on downlink signals received from RRUs.

(2) Case in which the UE sets the user centric TA

Figure 12:
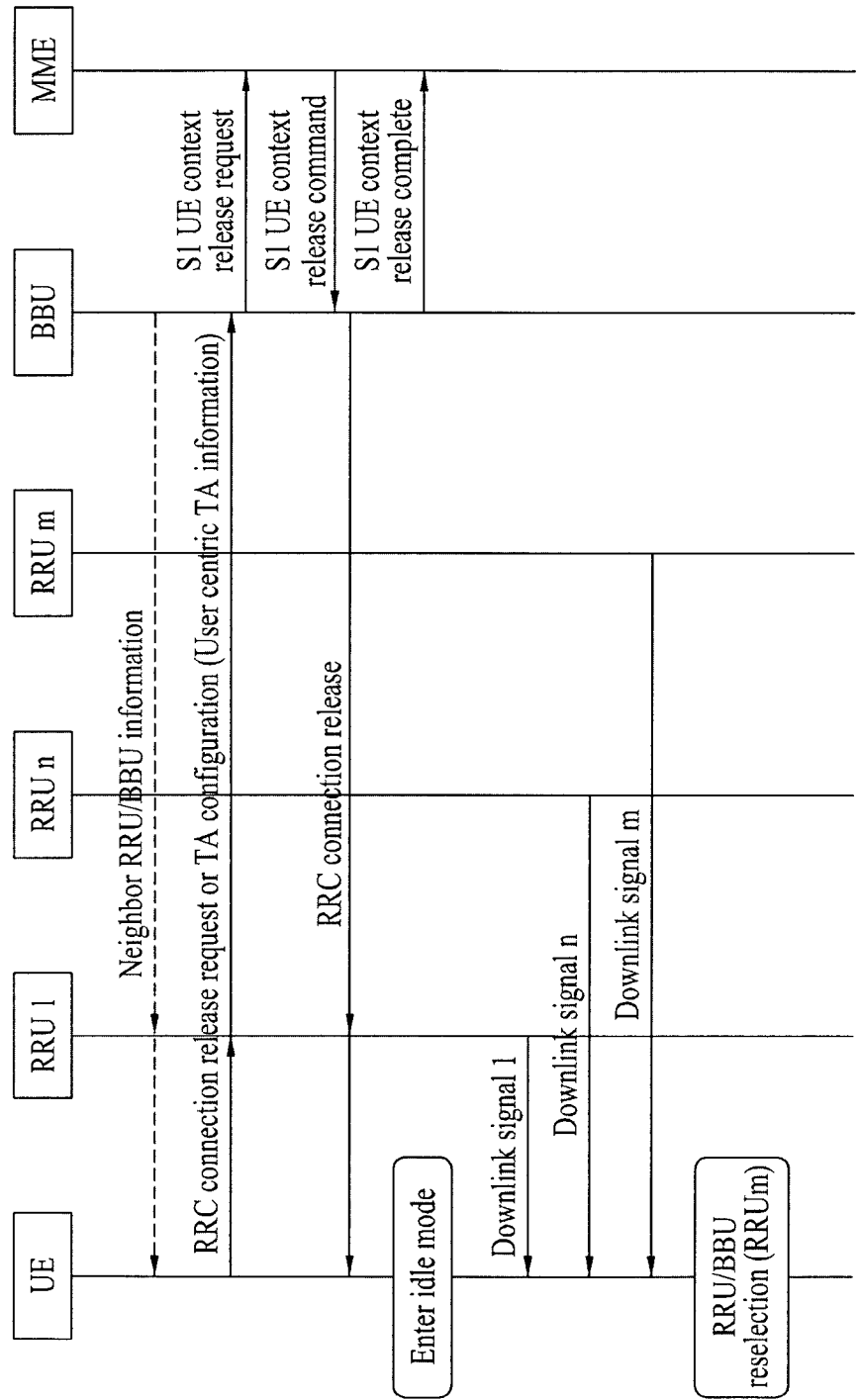
FIG. 12 illustrates a procedure in which a UE sets a user centric TA thereof.

FIG. 12 illustrates a procedure in which the UE sets the user centric TA thereof.

The UE may set the TA thereof based on characteristics thereof. The UE can set the TA using neighbor RRU or BBU information periodically transmitted from the BBU. The UE includes user centric TA information in an RRC connection release request message or a newly defined message such as tracking area configuration and transmits the message to the MME through the eNB (BBU) when entering the idle mode. Upon reception of the user centric TA information through the RRC message, the eNB (BBU) may deliver the corresponding information to the MME through S1 UE context release request message. Upon reception of the corresponding information, the MME transmits S1 UE context command message for instructing the eNB (BBU) to release context of the UE to the eNB (BBU). The user centric TA can be set per RRU or BBU and the transmitted information can be defined as one of the following information types.

a. RRU ID list
b. BBU ID list
c. RRU and BBU mapping ID list
d. BBU pool ID

Here, the aforementioned information may include RRU ID and BBU ID with respect to a plurality of RATs. The UE in the idle mode may reselect a BBU/RRU based on downlink signals received from RRUs.

2) TA update of an idle mode UE

When a UE that has registered the user centric TA thereof escapes the TA due to movement, the TA needs to be updated. A TA update (TAU) procedure can be performed through one of the following two methods according to the subject that sets the user centric TA. TAU may be started by the UE upon recognizing that the UE has left the TA.

(1) Case in which the network sets the user centric TA of the U

Figure 13:
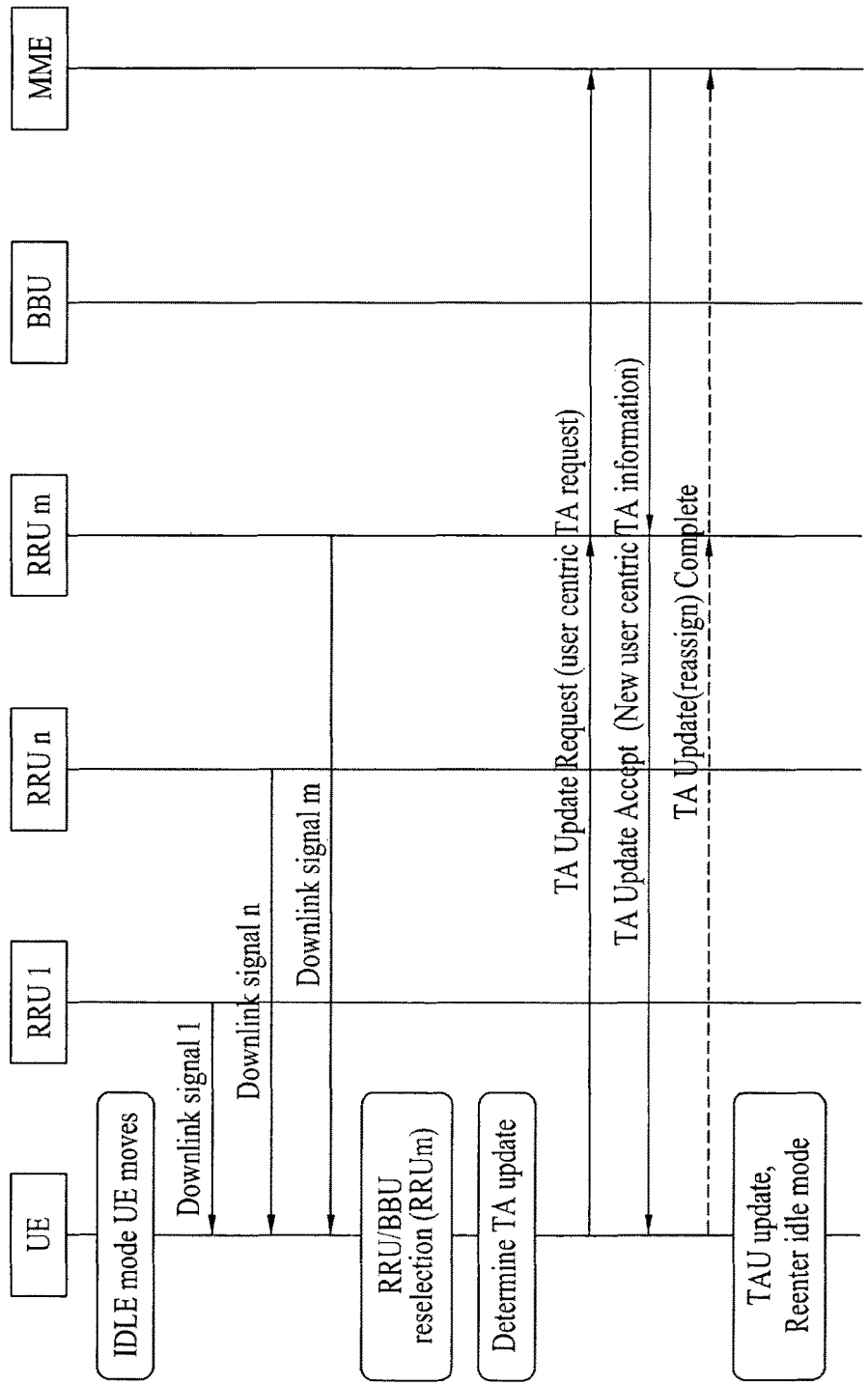
FIG. 13 illustrates a TA update procedure when a network sets a user centric TA of a UE.

FIG. 13 illustrates a TAU procedure when the network sets the user centric TA of the UE.

Referring to FIG. 13, the UE may determine whether to update the TA upon recognizing that the UE has left the TA. When the UE determines TA update, the UE needs to request the network (e.g. MME) to set a new TA. The UE can request user centric TA update to the network (e.g. MME) through a conventional TAU procedure and receive new user centric TA information from the network (e.g. MME) as a response to the request through a TA update acknowledgement message. This procedure can be performed through conventional TAU request and TA update acknowledgement NAS messages. The present invention provides a method of adding a user centric TA request field to the TA update request message and transmitting a new user centric TA of the UE, which is set by the network (e.g. MME), through the TA update acknowledgement message. In addition, the present invention defines a new message procedure. That is, the UE may request TA reassignment to the network (e.g. MME) through a TA reassignment request message and the network (e.g. MME) may allocate a newly set user centric TA to the UE through a TA reassignment command message upon reception of the TA reassignment request message. Upon successful reception of the TA reassignment command message, the UE may notify the network (e.g. MME) of successful TA reassignment through a TA reassignment complete message. The user centric TA can be set per RRU or BBU and the transmitted information can be defined as one of the following information types.

a. RRU ID list
b. BBU ID list
c. RRU and BBU mapping ID list
d. BBU pool ID (2) Case in which the UE sets the user centric TA FIGS. 14 and 15 illustrate procedures when the UE sets the user centric TA.

The UE may determine whether to update the TA upon recognizing that the UE has left the TA. When the UE determines TA update, the UE needs to request that the network (e.g. MME) set a new TA. The UE can request user centric TA update to the network (e.g. MME) through a conventional TAU procedure and receive new user centric TA information from the network (e.g. MME) as a response to the request through a TA update acknowledgement message. This procedure can be performed through conventional TAU request and TA update acknowledgement NAS messages. The present invention adds the user centric TA request field to the TA update request message such that the UE can transmit user centric TA information newly set based on characteristics thereof to the network (e.g. MME) through the TA update request message. Upon reception of the user centric TA information, the network (e.g. MME) notifies the UE of successful reception of the new user centric TA information through the TA update acknowledgement message.

In addition, the UE may need to receive neighbor RRU or BBU information transmitted from a selected RRU/BBU prior to transmission of the TA update request message in order to newly set the user centric TA thereof. The neighbor RRU or BBU information may be received using one of the following methods.

Figure 14:
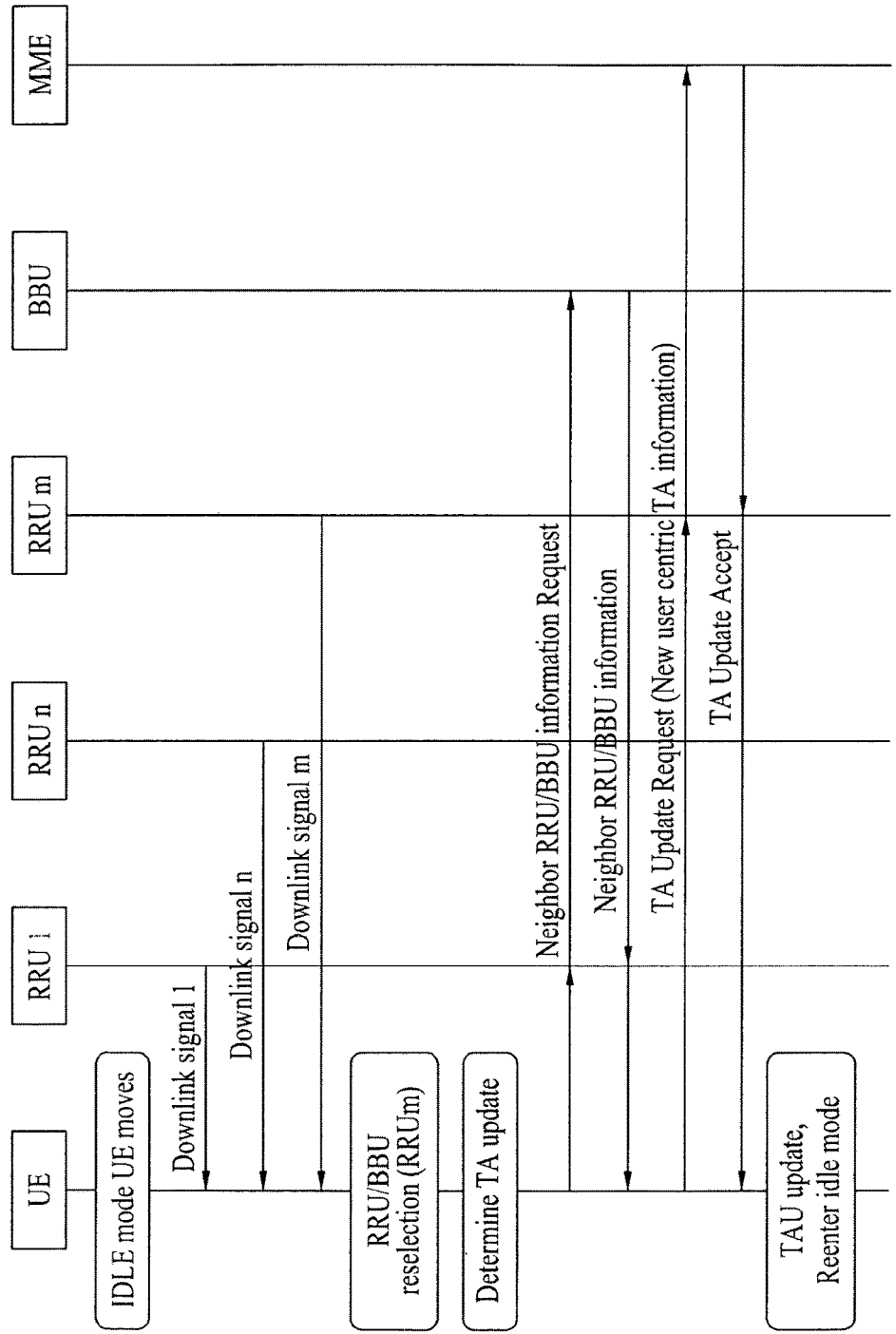
FIGS. 14 and 15 illustrate TA update procedures when a UE sets a user centric TA.
Figure 15:
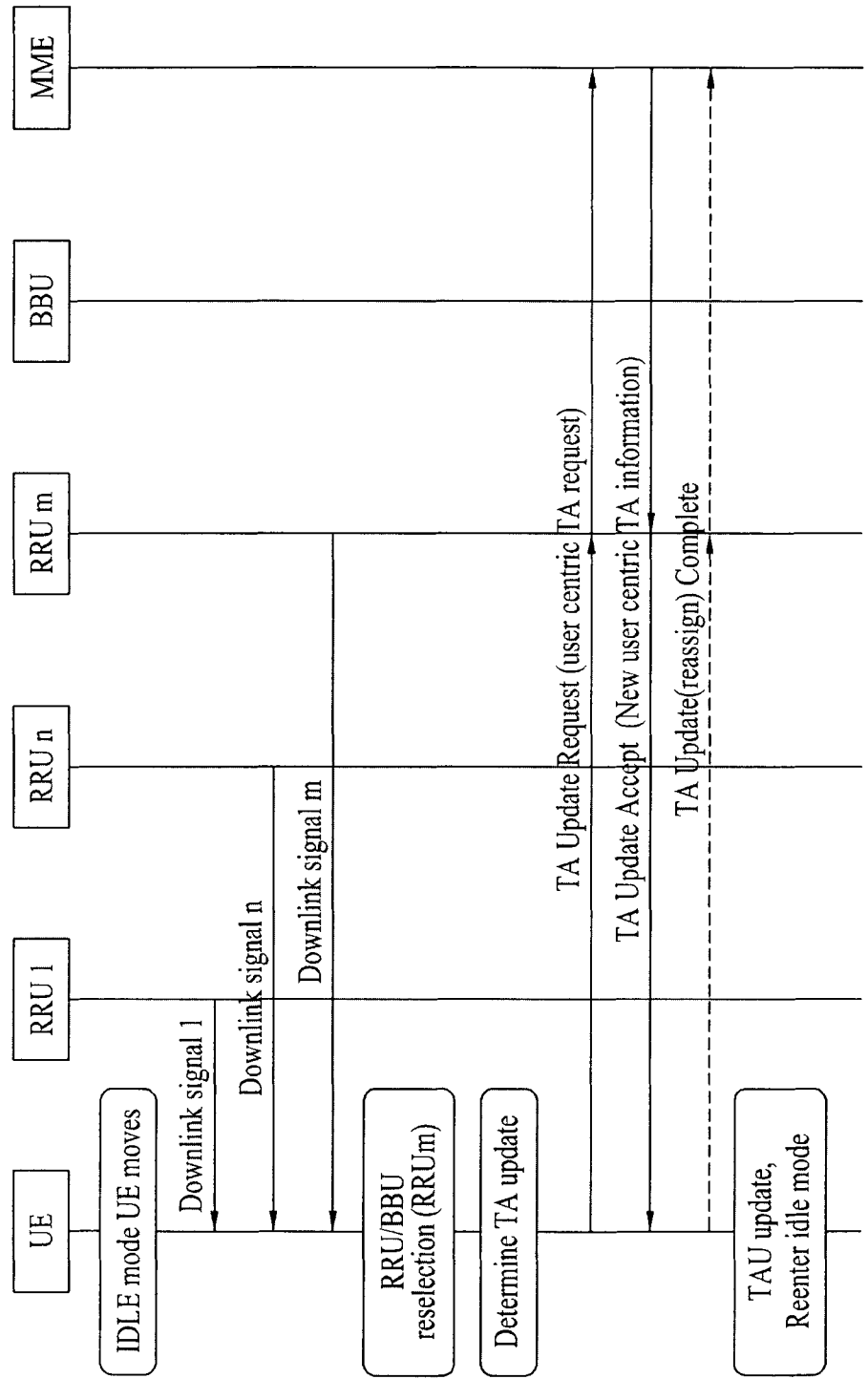

As shown in FIG. 14, when a neighbor RRU or BBU information message is periodically transmitted, the UE may awake at the message transmission time to receive the neighbor RRU or BBU information and update the TA thereof with reference to the received neighbor RRU or BBU information.

Referring to FIG. 15, the UE may switch to the connected mode, request that the BBU transmit the neighbor RRU or BBU information, receive the neighbor RRU or BBU information message as a response to the request through a unicast message and update the TA thereof based on the received neighbor RRU or BBU information.

The user centric TA can be set per RRU or BBU and the transmitted information can be defined as one of the following information types.

a. RRU ID list
b. BBU ID list
c. RRU and BBU mapping ID list
d. BBU pool ID

As described above, the idle mode UE can reselect an RRU/BBU using user centric TA information set based on UE characteristics in the C-RAN, to thereby efficiently set and update the TA.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The method for performing tracking area (TA) update by a UE in a cloud radio access network (C-RAN) according to the present invention is industrially applied to wireless communication system such as 3GPP LTE/LTE-A system.

The invention claimed is:

1. A method for performing a tracking area (TA) update by a user equipment (UE) in a cloud radio access network (C-RAN), the method comprising:
   receiving a list of neighbor radio remote units (RRUs) from a serving eNodeB (eNB);

setting a TA based on the list and characteristics of the UE; and transmitting information on the set TA to the serving eNB through a radio resource control (RRC) connection release request message or a TA configuration message.

2. The method according to claim 1, wherein the characteristics of the UE include at least one of the location, moving speed, mobility or capability of the UE.

3. The method according to claim 2, wherein the TA is set wider when the UE has high mobility than when the UE has low mobility.

4. The method according to claim 1, wherein the TA is set in units of a number of RRUs.

5. The method according to claim 1, further comprising determining whether to update the set TA when the UE exits the set TA.

6. A user equipment (UE) for performing a tracking area (TA) update in a cloud radio access network (C-RAN), the UE comprising:

a receiver configured to receive a list of neighbor radio remote units (RRUs) from a serving eNodeB (eNB);

a processor configured to set a TA based on the list and characteristics of the UE; and a transmitter configured to transmit information on the set TA to the serving eNB through an RRC connection release request message or a TA configuration message.

7. The UE according to claim 6, wherein the processor is configured to determine whether to update the set TA when the UE exits the set TA.

8. The UE according to claim 6, wherein the characteristics of the UE include at least one of the location, moving speed, mobility or capability of the UE.

9. The UE according to claim 8, wherein the processor is configured to set the TA wider when the UE has high mobility than when the UE has low mobility.

10. The UE according to claim 6, wherein the processor is configured to set the TA in units of a number of RRUs.

* * * * *